(12) United States Patent
Bucheru et al.

(10) Patent No.: US 9,887,630 B2
(45) Date of Patent: Feb. 6, 2018

(54) GAIN ADJUSTMENT CIRCUIT TO ENHANCE STABILITY OF MULTIPLE-OUTPUT AC/DC CONVERTERS

(71) Applicant: Apple Inc., Cupertino, CA (US)

(72) Inventors: Bogdan T. Bucheru, Austin, TX (US); Zaohong Yang, Plano, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/354,705

(22) Filed: Nov. 17, 2016

(65) Prior Publication Data

US 2017/0346406 A1 Nov. 30, 2017

Related U.S. Application Data

(60) Provisional application No. 62/342,546, filed on May 27, 2016.

(51) Int. Cl.
*H02M 3/335* (2006.01)

(52) U.S. Cl.
CPC .... *H02M 3/33523* (2013.01); *H02M 3/33507* (2013.01)

(58) Field of Classification Search
CPC ............. H02M 3/335; H02M 3/33507; H02M 3/33523; H02M 3/33569; H02M 3/33576
See application file for complete search history.

(56) References Cited

U.S. PATENT DOCUMENTS

| 5,914,865 A * | 6/1999 | Barbehenn | H02M 1/40 323/902 |
| 6,058,026 A | 5/2000 | Rozman | |
| 6,865,094 B2 * | 3/2005 | Malik | H02J 9/005 363/21.12 |
| 7,023,710 B2 * | 4/2006 | Durbaum | H02M 1/12 363/19 |
| 8,520,415 B1 * | 8/2013 | Krishnamoorthy | H02M 3/33523 363/21.07 |
| 8,680,787 B2 | 3/2014 | Veskovic | |
| 2014/0016373 A1 | 1/2014 | Zhang | |
| 2014/0192566 A1 * | 7/2014 | Yang | H02M 3/33523 363/21.15 |
| 2015/0222192 A1 | 8/2015 | Freeman | |
| 2015/0249393 A1 | 9/2015 | Zhang | |
| 2016/0105116 A1 | 4/2016 | Chang | |
| 2016/0329820 A1 * | 11/2016 | Mohtashemi | H02M 3/33523 |

FOREIGN PATENT DOCUMENTS

DE 4241197 C1 7/1994

OTHER PUBLICATIONS

Lempinen J et al; "Small-signal modeling for design of robust variable-frequency flyback battery chargers for portable device applications"; APEC 2001; 16h Annual IEEE Applied Power Electronics Confrerence and Exposition; pp. 548-554.

* cited by examiner

*Primary Examiner* — Matthew Nguyen
(74) *Attorney, Agent, or Firm* — Blank Rome LLP (57) ABSTRACT

This disclosure describes an AC/DC power converter that produces multiple output voltage levels. The AC/DC power converter may include a gain adjustment circuit. The gain adjustment circuit may adjust the gain of a feedback signal of the converter in accordance with the converter's output voltage level. The gain adjustment circuit provides sufficient gain and phase margins to the converter and thus enhances the converter's stability.

20 Claims, 10 Drawing Sheets

GAIN ADJUSTMENT CIRCUIT TO ENHANCE STABILITY OF MULTIPLE-OUTPUT AC/DC CONVERTERS

CROSS-REFERENCE TO RELATED APPLICATION

This application claims priority under 35 U.S.C. § 119(e) to U.S. Provisional Application Ser. No. 62/342,546, entitled "Gain Adjustment Circuit to Enhance Stability of Multiple-Output AC/DC Converters," by Bogdan T. Bucheru and Zaohong Yang, filed on May 27, 2016, the contents of which are herein incorporated by reference.

TECHNICAL FIELD

This disclosure relates generally to power converters, and in particular, to a gain adjustment circuit that enhances the stability of AC/DC converters having multiple output voltage levels.

BACKGROUND

With advances in technology, many electronic devices have come to require varying input voltage levels, depending on their application at a given moment. As a result, power converters with multiple output voltage levels have become increasingly desirable. For example, the evolving USB Power Delivery standard requires power supplies that are capable of providing multiple levels of output voltages—such as 5V, 9V, 12V, 15V and 20V, for example—in accordance with loads connected to USB ports. Applications requiring such diversity in voltage levels make designing AC/DC power converters challenging. When the converter's output voltage level varies, the operation and associated power train transfer function of the converter changes. Converters designed to deliver primarily one output voltage level may not be able to maintain stability and function properly at a different level.

SUMMARY

This disclosure describes an AC/DC power converter that produces multiple output voltage levels. The AC/DC power converter may include a gain adjustment circuit. The gain adjustment circuit may adjust the gain of a feedback signal of the converter in accordance with the converter's output voltage level. The gain adjustment circuit provides gain and phase margins to the converter to enhance the converter's stability.

The AC/DC power converter may include a main power circuit and an auxiliary circuit. The main power circuit may include an AC/DC rectifier and a DC/DC converter, while the auxiliary circuit may include a controller and a feedback circuit. The main power circuit handles the primary power to be converted, and the auxiliary circuit provides monitoring and control functionalities. Within the auxiliary circuit, the feedback circuit may include an optocoupler that may be configured to convey a feedback signal representative of the output voltage as a control signal to a first switch of the DC/DC converter. The feedback circuit may further include a gain adjustment circuit. The gain adjustment circuit may include a first resistor and a second switch, where the first resistor is coupled in parallel to the second switch and meanwhile in series to the optocoupler. The gain adjustment circuit may be configured to adjust a gain of the feedback signal by controlling a flow of current through the optocoupler by the first resistor and the second switch based, at least in part, on the output voltage of the AC/DC power converter.

In one embodiment, the optocoupler may include a LED at input and a phototransistor at output. The flow of current through the LED generates light. The generated light is applied to the phototransistor and generates a corresponding collector current in the phototransistor, which in turn, adjusts a collector-to-emitter voltage of the phototransistor. The output voltage of the AC/DC power converter is provided to the input terminals of the optocoupler, which affects the flow of current through the LED. Meanwhile, the collector-to-emitter voltage at the output of the optocoupler is provided to the controller, which causes a feedback signal to be sent to the controller. Thus, through the optocoupler, the AC/DC power converter may monitor (or sense) the output voltage and generate the feedback signal in accordance with the output voltage. The gain adjustment circuit may be configured to turn off the second switch, and thereby maintain the first resistor in series with the optocoupler while operating at one output voltage level. The gain adjustment circuit may also be configured to turn on the second switch and thus take the first resistor out of the series connection with the optocoupler at another voltage level. As the resistor is added to and removed from the series connection to the optocoupler, the topology of the feedback circuit varies and the gain of the feedback signal is adjusted. The gain adjustment may improve the gain and phase margins of the AC/DC power converter, and consequently enhance its stability.

In one embodiment, the second switch may be controlled by a reference voltage source and a Zener diode. By selecting the reference voltage source and Zener diode appropriately, the gain adjustment circuit may turn on the second switch at one output voltage level and turn it off at another.

In another embodiment, the second switch may be controlled by a reference voltage, a Zener diode, and a voltage dividing circuit. The voltage dividing circuit may include a plurality of resistors. By selecting the reference voltage source, Zener diode, and voltage dividing circuit appropriately, the gain adjustment circuit may turn on and off the second switch in accordance with at least two voltage levels.

In another embodiment, each one and/or some of the plurality of resistors within the voltage dividing circuit may be coupled in parallel to individual bypass switches. Controlling the individual bypass switches may provide even more voltage dividing ratios and thus turn on and off the second switch at more than two voltage levels.

In another embodiment, the second switch may be controlled by a reference voltage source, a third switch, and an adjustable reference voltage source. The adjustable reference voltage source may be configured to control the second switch through the third switch and the reference voltage source based on the output voltage of the AC/DC power converter in accordance with different output voltage levels.

In another embodiment, the second switch may be controlled by an adjustable reference voltage source. The adjustable reference voltage source may be configured to control the second switch directly in accordance with different output voltage levels. The adjustable reference voltage source may be a processor.

In another embodiment, instead of using one single resistor for the first resistor, the gain adjustment circuit may use a plurality of resistors. The plurality of resistors may be arranged in series and/or parallel configurations, where each one and/or some of the plurality of resistors may be coupled in parallel to individual bypass switches and/or series to individual isolation switches. Controlling the individual bypass and/or isolation switches allows for subtraction and/ or addition of various resistance to the converter's feedback circuit and thus provides even more gain adjustment flexibilities.

In another embodiment, the AC/DC rectifier of the AC/DC power converter may be based on a diode bridge front-end. The AC/DC rectifier may also use a different type of AC/DC rectifier, e.g., a synchronous rectifier, or a resonant rectifier. The DC/DC converter of the AC/DC power converter may be based on a flyback converter. Other types of DC/DC converters may also be used, such as a switched-capacitor converter, or a forward converter. The DC/DC converter may further be an unidirectional DC/DC converter or a bidirectional DC/DC converter.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one", or "another" embodiment in this disclosure are not necessarily to the same embodiment, and they mean at least one. In order to be concise, a given figure may be used to illustrate the features of more than one embodiment, or more than one species of the disclosure, and not all elements in the figure may be required for a given embodiment or species.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
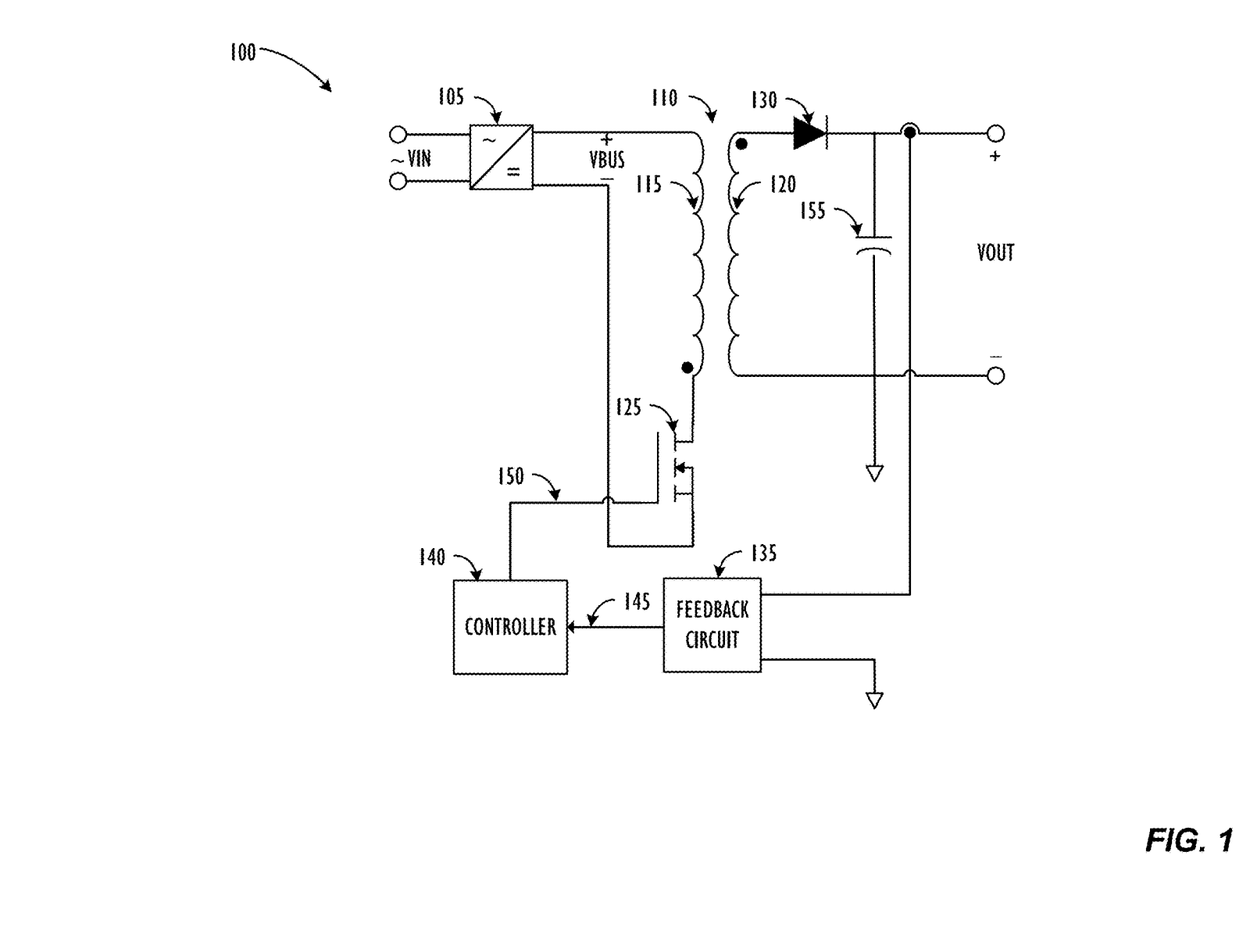
FIG. 1 is a schematic diagram illustrating an exemplary AC/DC power converter in accordance with one embodiment.

FIG. 1 is a schematic diagram of an exemplary AC/DC power converter 100 in accordance with one embodiment. Converter 100 may include AC/DC rectifier 105, which may receive AC input voltage $V_{IN}$ and generate DC voltage $V_{BUS}$. Rectifier 105 may be a diode-front end, a synchronous rectifier, or any other type of rectifier circuits. Converter 100 may also include transformer 110, which may have primary winding 115 and secondary winding 120. Primary winding 115 may be configured to receive DC bus voltage $V_{BUS}$ through switch 125. Switch 125 may be a metal-oxide-semiconductor field-effect transistor (MOSFET), an insulated-gate bipolar transistor (IGBT), a silicon-carbine device, or any other type of switching devices that can be turned on and off by appropriate control signals. Secondary winding 120 of transformer 110 may be coupled to an output terminal of converter 100 through diode 130, where output voltage $V_{OUT}$ may be generated. Typically, the output terminal may also include filter capacitor 155 to improve power quality of the output. Instead of using diode 130, converter 100 may use any other type of switching devices that can be configured to provide unidirectional current conduction capabilities. As illustrated in FIG. 1, transformer 110, switch 125, and diode 130 form a DC/DC flyback converter as a succeeding stage to rectifier 105. The flyback converter may receive DC bus voltage $V_{BUS}$ and convert it to DC output voltage $V_{OUT}$ at different levels. The DC-to-DC power conversion is achieved by controlling the switching of switch 125. Switching of switch 125 regulates the flow of current through primary winding 115, manages the amount of energy transferred to secondary winding 120, and thus controls output voltage $V_{OUT}$. Rectifier 105, transformer 110, switch 125 and diode 130 form the "main power circuit" since they handle the primary power being converted by converter 100.

Converter 100 may also include an "auxiliary circuit" that serves as a "brain" to provide monitoring and control functionalities. For example, converter 100 may include feedback circuit 135 and controller 140. Feedback circuit 135 may monitor (or sense) converter 100's outputs voltage $V_{OUT}$ and generate feedback signal 145 as a result. Controller 140 may receive feedback signal 145, execute control algorithms, and generate control signal 150. The control algorithms may include comparison, proportional, integral, and/or derivative operations. As shown in FIG. 1, control signal 150 may be used to control the switching of switch 125, which may in turn regulate output voltage $V_{OUT}$. To simplify explanation, FIG. 1 only illustrates one single signal being sensed (e.g., output voltage $V_{OUT}$), one signal feedback signal being conveyed (e.g., feedback signal 145), and one single control signal being generated (e.g., control signal 150). It should be noted that converter 100 may monitor more than one signals and generate more than one feedback and/or control signals. During operations, converter 100 may work as a closed-loop system. Feedback circuit 135 may monitor output voltage $V_{OUT}$ and generate feedback signal 145. Controller 150 may receive feedback signal 145 and generate control signal 150. Converter 100 may use control signal 150 to control the switching of switch 125 and in turn regulate the output voltage $V_{OUT}$.

For a converter to function properly, the converter must remain stable. The stability of a converter may be analyzed according to its Bode plots. A Bode plot represents the frequency response of a system, e.g., an output spectrum of the system in response to an input stimulus of a sweeping frequency. In other words, the Bode plot represents the transfer function (or "gain") of the system in the frequency domain. A Bode plot may be a combination of a Bode magnitude plot, expressing the magnitude (usually in decibels or dBs) of the frequency response, and a Bode phase plot, expressing the phase shift (usually in degrees) of the frequency response. The stability of a closed-loop system may be determined by analyzing the Bode plots of its corresponding open-loop transfer function. When the Bode plots show sufficient gain and phase margins, the closed-loop system will remain stable. The gain margin is defined as the magnitude in the Bode magnitude plot at the frequency where the phase shift reaches negative 180-degrees (or modulo zero-degrees) in the Bode phase plot, and the phase margin is defined as the difference between the phase shift and negative 180-degrees (or modulo zero-degrees) in the Bode phase plot at the frequency where the magnitude reaches zero in the Bode magnitude plot. From a stability standpoint, it may be desirable that the gain margin exceeds a gain threshold (e.g., 10-dBs) and the phase margin exceeds a phase threshold (e.g., 60-degrees). One purpose of the auxiliary circuit, including the feedback circuit and controller, is to maintain the gain and phase margins within appropriate ranges. In one embodiment, the auxiliary circuit of a converter may maintain the gain and phase margins by adjusting a gain of a feedback signal using a gain adjustment circuit.

Figure 2:
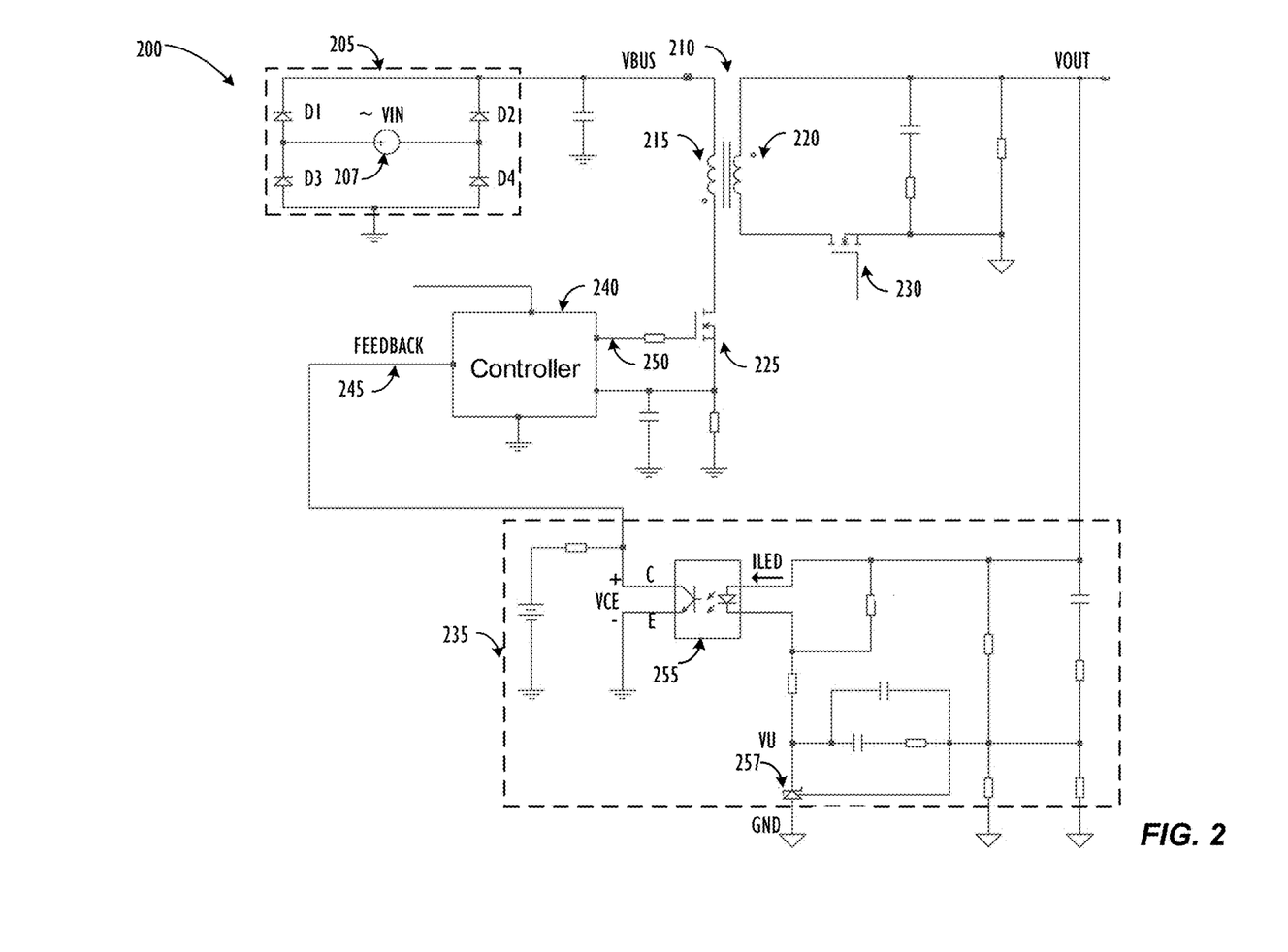
FIG. 2 is a schematic diagram illustrating an exemplary AC/DC power converter in accordance with another embodiment.

FIG. 2 illustrates a schematic diagram of exemplary AC/DC power converter 200 in accordance with one embodiment. Converter 200 may include AC/DC rectifier 205, which may include a diode front-end (e.g., four diodes D1-D4) that is coupled to an AC voltage source 207. Rectifier 205 may convert AC input voltage $V_{IN}$ from AC voltage source 207 to DC bus voltage $V_{BUS}$. Converter 200 may also include transformer 210, switch 225, and switch 230. Transformer 210 may have primary winding 215 and secondary winding 220. Primary winding 215 may be configured to receive DC bus voltage $V_{BUS}$ through switch 225. Secondary winding 220 may be coupled to an output terminal through switch 230, where output voltage $V_{OUT}$ may be generated. Transformer 210, switch 215, and switch 230 may form a flyback converter as a succeeding stage of rectifier 205, which converts DC bus voltage $V_{BUS}$ to output voltage $V_{OUT}$. It is noted that switch 230, instead of a diode, is shown in FIG. 2. Switch 230, may function as a diode using its intrinsic, anti-parallel body diode. As described in the example of FIG. 1, converter 200 may control the flow of current through primary winding 215 through switch 225 and thus regulate output voltage $V_{OUT}$. Switch 225 may be controlled by control signal 250. Converter 200 may sense output voltage $V_{OUT}$ and generate feedback signal 245 using feedback circuit 235. Further, converter 200 may generate control signal 250 based on feedback signal 245 using controller 240.

In one embodiment, feedback circuit 235 may monitor output voltage $V_{OUT}$ and generate feedback signal 245 using optocoupler 255, as shown in FIG. 2. Optocoupler 255 may include an LED at input and a phototransistor at output. Current $I_{LED}$ flows through the LED and generates light. The light is applied to the phototransistor and generates a corresponding collector current, which, in turn, adjusts collector-to-emitter voltage $V_{CE}$ across the phototransistor's collector (or "C") and emitter (or "E"). Current $I_{LED}$ is based on the differential voltage across the LED. As illustrated in FIG. 2, this differential voltage depends on voltages $V_{OUT}$ and $V_U$, where voltage $V_U$ may be a constant voltage, for example, created by adjustable voltage regulator 257. The differential voltage between output voltage $V_{OUT}$ and voltage $V_U$ may be used as an error signal. When output voltage $V_{OUT}$ changes, the error signal changes accordingly, current $I_{LED}$ and the associated light vary as well. This further results in a corresponding change of voltage $V_{CE}$ at the output of optocoupler 255. Because voltage $V_{CE}$ is in the circuit loop of feedback circuit 245, a change of voltage $V_{CE}$ will be reflected in feedback signal 245. In short, a change of output voltage $V_{OUT}$ is reflected in (or sensed by) feedback signal 245. Feedback signal 245 is provided to controller 240, which creates control signal 250 for switch 225. As an "interface", optocoupler 255 functions to convey feedback signal 245 representative of output voltage $V_{OUT}$ as a control signal to switch 225. FIG. 2 also illustrates other discrete components, for example, resistors and capacitors. These discrete components provide functionalities such as current limiting, voltage dividing, and/or filtering, many of which incorporate typical circuit design practices. Thus, to simplify explanation, not all the discrete components are discussed in this disclosure.

Figure 3:
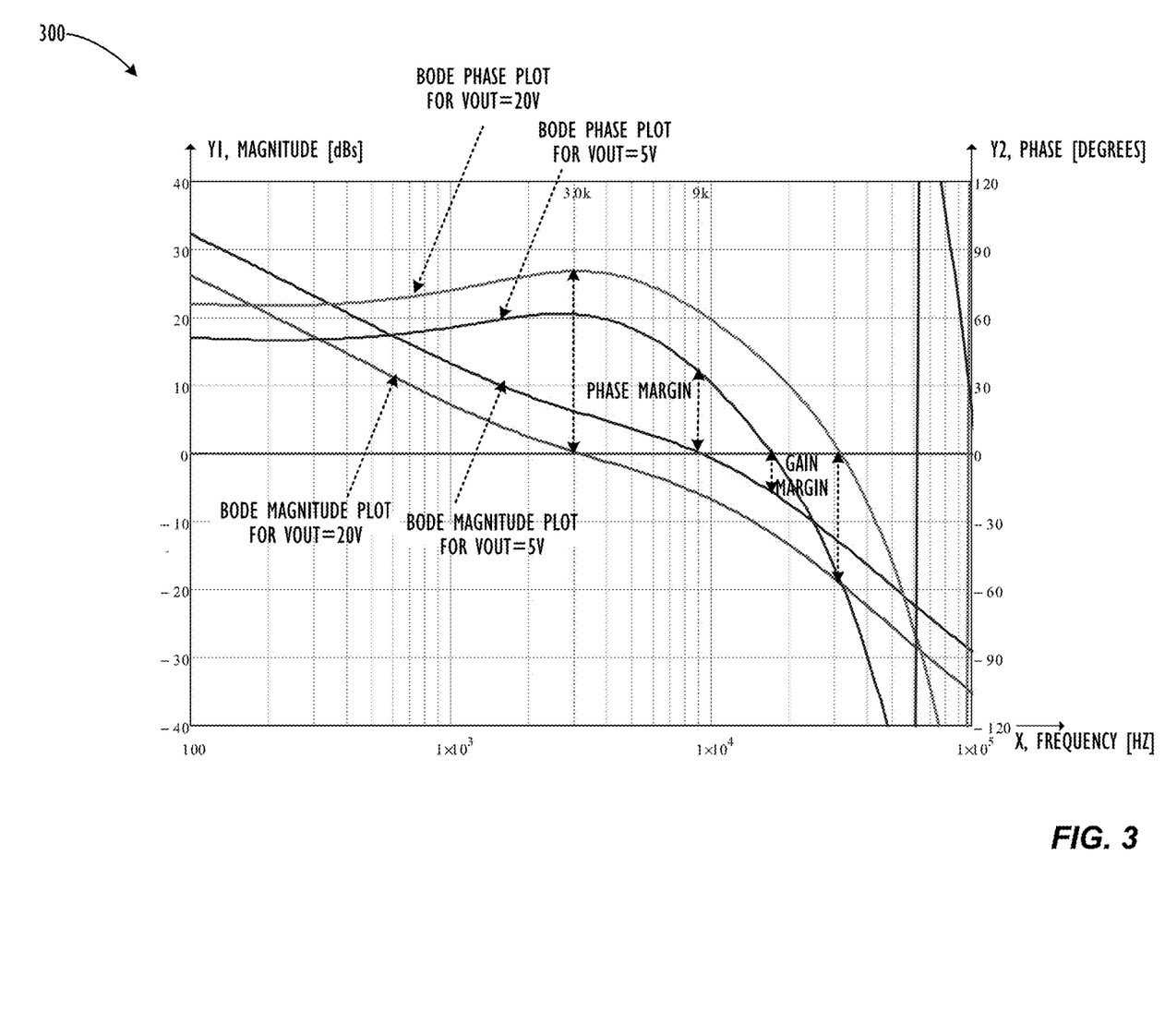
FIG. 3 is a Bode plot of an exemplary AC/DC power converter when it is operated to produce output voltages of 5V and 20V in accordance with one embodiment.

FIG. 3 illustrates the Bode plots of converter 200 when it is operated to produce exemplary output voltages of 5V and 20V. In FIG. 3, the horizontal X-axis represents frequency in Hz, the vertical Y1-axis on the left side represents the magnitude in dBs, and the vertical Y2-axis on the right side represents the phase shifts in degrees. As described above, the stability of converter 200 may be determined by analyzing its Bode plots. In particular, converter 200's stability may be determined by examining its gain and phase margins. As shown in FIG. 3, when converter 200 produces an output voltage of 5V, its gain margin is approximately 4-dBs, and its phase margin is approximately 35-degrees. When converter 200 produces an output voltage of 20V, its gain and phase margins are approximately 22-dBs and 75-degrees, respectively. According to the above discussions and exemplary margin thresholds, converter 200 will function properly at the output voltage of 20V, but may be less stable at the output voltage of 5V.

Figure 4:
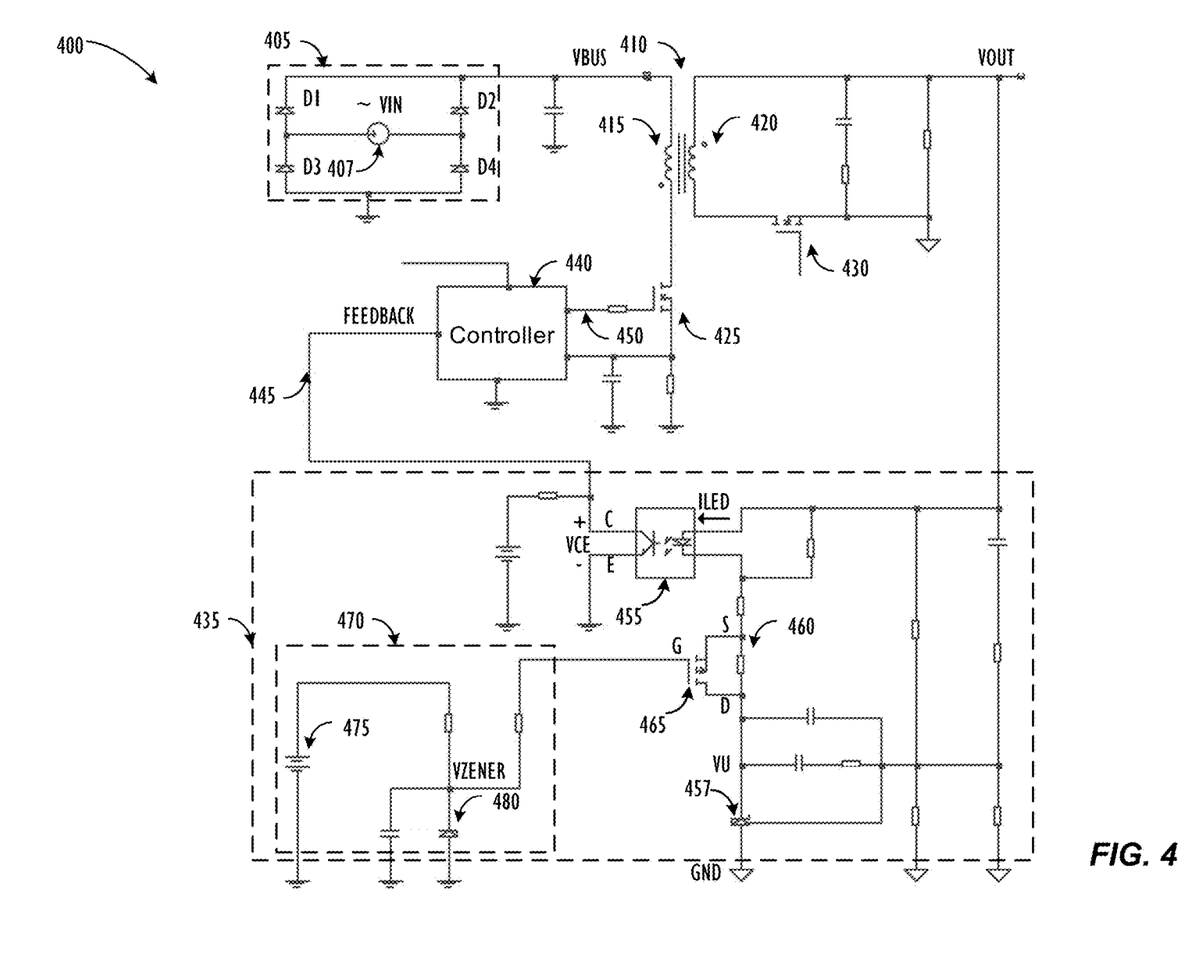
FIG. 4 is a schematic diagram illustrating an exemplary AC/DC power converter in accordance with another embodiment.

FIG. 4 is a schematic diagram illustrating exemplary AC/DC power converter 400 in accordance with another embodiment. Converter 400 shares some similarities with converter 200 in FIG. 2. For example, converter 400 may include rectifier 405, which may include a diode front-end (e.g., diodes D1-D4) that is coupled to AC voltage source 407. Rectifier 405 may convert AC input voltage $V_{IN}$ from AC voltage source 407 to DC bus voltage $V_{BUS}$. Converter 400 may also include transformer 410, switch 425, and switch 430. Transformer 410 may have primary winding 415 and secondary winding 420. As shown here, primary winding 415 may be configured to receive DC bus voltage $V_{BUS}$ through switch 425. Secondary winding 420 may be coupled to an output terminal, where output voltage $V_{OUT}$ may be generated, through switch 430. Transformer 410, switch 415, and switch 430 form a flyback converter as a succeeding stage of rectifier 405, which converts DC bus voltage $V_{BUS}$ to output voltage $V_{OUT}$. As explained above, converter 400 may regulate output voltage $V_{OUT}$ by controlling switch 425 using control signal 450. Converter 400 may generate feedback signal 445, in accordance with output voltage $V_{OUT}$, using optocoupler 455. Feedback signal 445 may be sent to controller 440, which may use it to create control signal 450 for switch 425.

Converter 400's feedback circuit 435 may further include resistor 460 and switch 465. As shown in FIG. 4, resistor 460 is coupled in parallel to switch 465 and in series with optocoupler 455. Switch 465 may be a p-channel MOSFET or other alternative switching devices. Switch 465 may be controlled by control circuit 470, which may include voltage source 475 and Zener diode 480. As described above in the example of FIG. 2, optocoupler 455 may generate feedback signal 445 based on current $I_{LED}$ flowing through the LED at the input of optocoupler 455. When switch 465 is turned on, resistor 460 is bypassed (and thus removed from the series connection to optocoupler 455). When switch 465 is turned off, resistor 460 is retained in series with optocoupler 455. As resistor 460 is removed from and added to the series connection with optocoupler 455, the impedance in series with optocoupler 455 varies, and thus current $I_{LED}$ flowing through optocoupler 455 changes as well. The change of current $I_{LED}$ further causes corresponding changes in collector-to-emitter voltage $V_{CE}$ and feedback signal 445. As control signal 450 is generated based on feedback signal 445, the impedance change at the input side of optocoupler 455 may impact the operation of switch 425. In summary, by using switch 465 and resistor 460, converter 400 may adjust the transfer function of feedback circuit 435 (or the gain of feedback signal 445) and modify the operation of switch 425.

Switch 465 may be controlled by control circuit 470. In FIG. 4, control circuit 470 includes reference voltage source 475 and Zener diode 480, where Zener diode 480 is anti-parallel to reference voltage source 475. By selecting reference voltage source 475 and Zener diode 480 appropriately, converter 400 may turn on switch 465 at one output voltage level and turn off switch 465 at another. For example, reference voltage source 475 may be selected as to provide 15V voltage, and Zener diode 480 may be selected to be rated at 13V (i.e., with 13V reverse breakdown voltage). As Zener diode 480 is reverse biased by reference voltage source 475, and the reverse voltage exceeds Zener diode 480's rating (i.e., 15V>13V), Zener diode 480 enters an avalanche mode, which clamps its terminal voltage (or "Vzener") to 13V. Operations of switch 465 depend on its terminal voltages at gate (or "G"), source (or "S"), and drain (or "D") terminals. In particular, as a p-channel MOSFET, switch 465 is turned off when gate-to-source voltage $V_{GS}$ exceeds a threshold voltage and turned on when otherwise. As shown in FIG. 4, switch 465's gate voltage $V_G$ is provided from voltage Vzener, and its source voltage $V_S$ comes from output voltage $V_{OUT}$. To simplify explanation, voltage drops across resistors in FIG. 4 are ignored as they are typically small values during normal operations of the illustrated embodiments. Thus, switch 465's gate voltage $V_G$ is also clamped to the same voltage of 13V as Vzener, and its source voltage $V_S$ varies with output voltage $V_{OUT}$. When output voltage $V_{OUT}$ changes from one level to another, switch 465's gate-to-source voltage $V_{GS}$ changes correspondingly, which may result in switching of switch 465.

Figure 5:
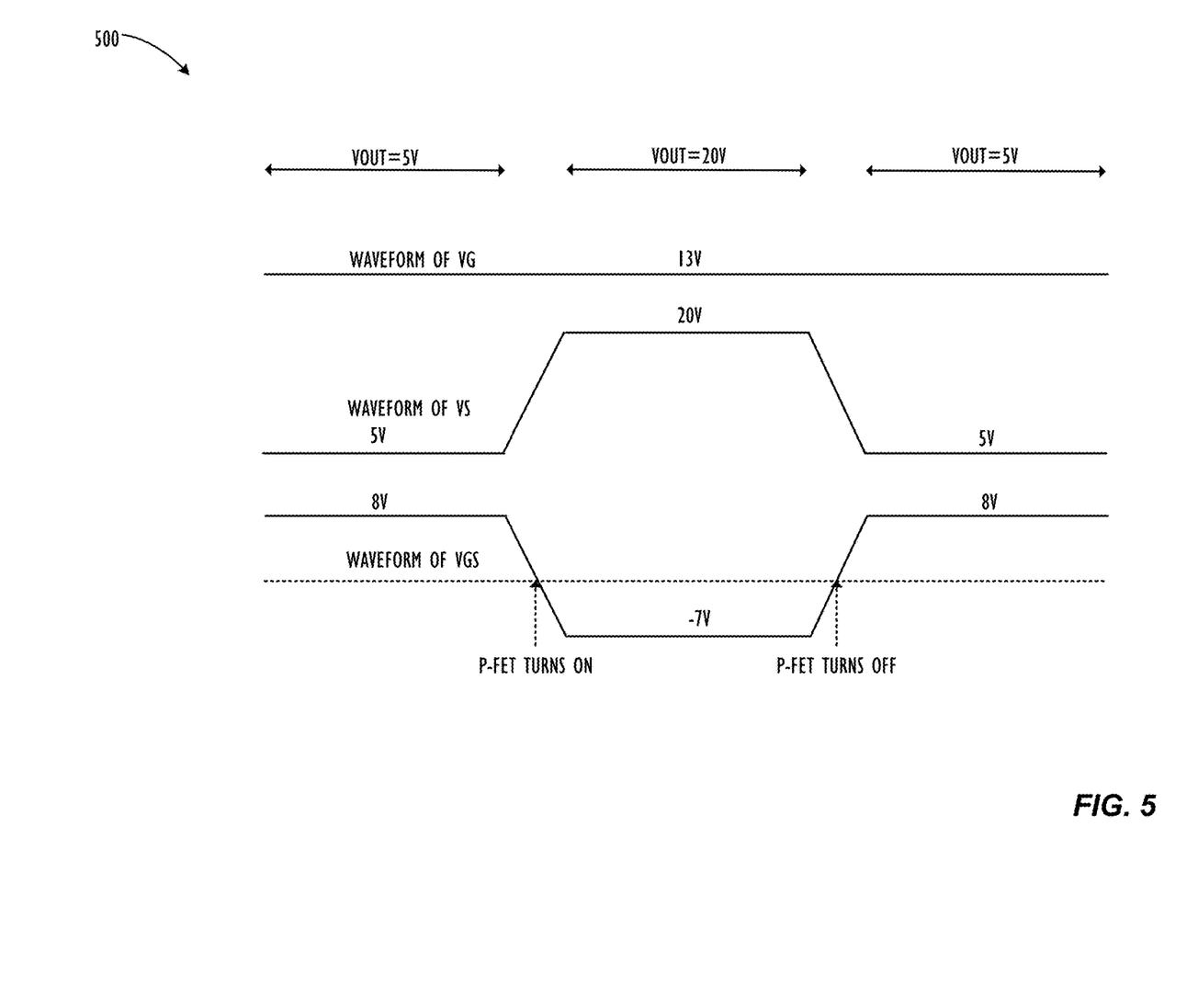
FIG. 5 illustrates the waveforms of gate voltage, source voltage, and gate-to-source voltage of a switch of an exemplary gain adjustment circuit in accordance with one embodiment.

FIG. 5 illustrates exemplary waveforms of gate voltage $V_G$, source voltage $V_S$, and gate-to-source voltage $V_{GS}$ of switch 465. In this example, switch 465's gate voltage $V_G$ is constant as it is clamped to 13V by Zener diode 480 (or $V_G=13V$), while source voltage $V_S$ varies in accordance with output voltage $V_{OUT}$. In particular, when output voltage $V_{OUT}$ reaches 5V, switch 465's gate-to-source voltage $V_{GS}$, which is the differential voltage between gate voltage ($V_G=13V$) and source voltage ($V_S=5V$), becomes 8V (i.e., $V_{GS}=V_G-V_S$). Conversely, when output voltage $V_{OUT}$ increases to 20V, switch 465's gate-to-source voltage $V_{GS}$ becomes −7V (i.e., $V_{GS}=V_G-V_S$). As a p-channel MOSFET, switch 465's threshold voltage is usually between −1V and −3V. Thus, switch 465 is turned on when its gate-to-source voltage $V_{GS}$ exceeds the threshold voltage as $V_{OUT}$ increases from 5V to 20V, which removes resistor 460 from the series connection to optocoupler 455. Conversely, switch 465 is turned off when its gate-to-source voltage $V_{GS}$ falls below the threshold voltage as $V_{OUT}$ reduces from 20V to 5V, which adds resistor 460 back to the series connection to optocoupler 455.

Figure 6:
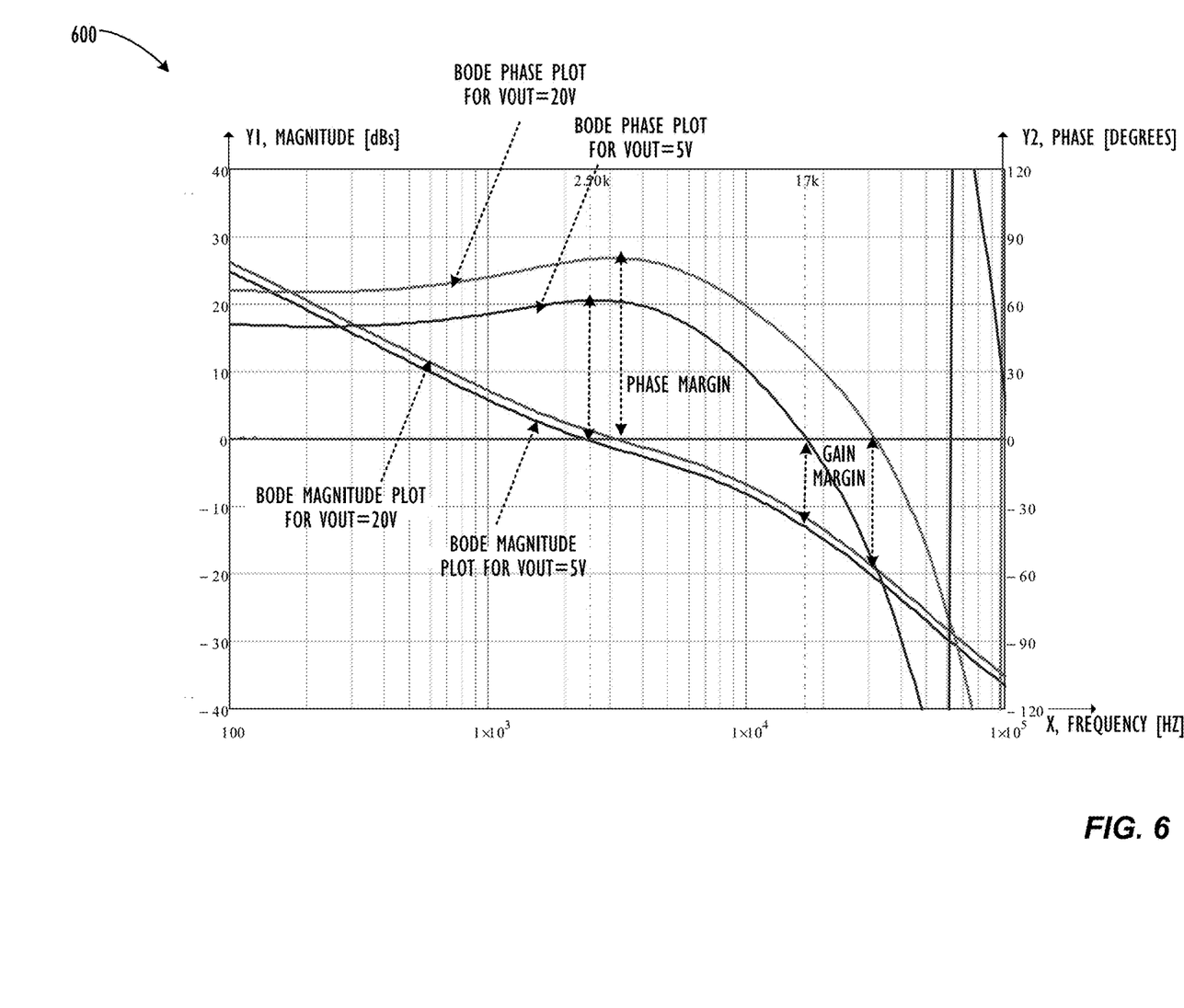
FIG. 6 is a Bode plot of an exemplary AC/DC power converter when it is operated to produce output voltages of 5V and 20V in accordance with another embodiment.

FIG. 6 illustrates the Bode plots of converter 400 when it produces exemplary output voltages of 5V and 20V, respectively. In FIG. 6, the horizontal X-axis represents the frequency, the vertical Y1-axis on the left side represents the magnitude in dB, and the vertical Y2-axis on the right side represents the phase shifts in degrees. As shown in FIG. 6, when converter 400 produces an output voltage of 5V, converter 400's gain margin is approximately 13-dBs and phase margin reaches approximately 62-degrees. Compared to FIG. 3, the gain and phase margins increase by 7-dBs (i.e., from 4-dBs to 13-dBs) and 27-degrees (i.e., from 35-degrees to 62-degrees), respectively. The margin increases result from the gain adjustment of feedback signal 445 and provide enhancement to the stability of converter 400. When converter 400 produces an output voltage of 20V, the gain and phase margins remains at approximately 22-dBs and 75-degrees, which are the same as the margins of converter 200 in FIG. 2. This is because, at 20V output voltage, resistor 460 is not presented in (or removed from) the series connection with optocoupler 455, thus creating the same gain for feedback signal 445.

Besides producing 5V and 20V, converter 400 may also be used to generate output voltages of other levels, for example, 9V and 20V, while still having the stability enhancement capabilities. For example, when output voltage $V_{OUT}$ reaches 9V, switch 465's source voltage $V_S$ changes to 9V (or $V_S=9V$), while gate voltage $V_G$ remains at 13V (or $V_G=13V$). This results in gate-to-source voltage $V_{GS}$ of 4V (i.e., $V_{GS}=V_G-V_S$), which allows switch 465 to remain off. When output voltage $V_{OUT}$ becomes 20V, switch 465's source voltage $V_S$ and gate-to-source voltage $V_{GS}$ become 20V and −7V, respectively, which turns on switch 465. In summary, switch 465 is turned on when $V_{OUT}$ increases from 9V to 20V, which removes resistor 460 from the series connection to optocoupler 455; switch 465 is turned off when $V_{OUT}$ reduces from 20V to 9V, which adds resistor 460 to the series connection with optocoupler 455. As resistor 460 is removed and added, converter 400 may adjust the gain of feedback signal 445 and increase the gain and phase margins. The operations of converter 400 may be extended to other output voltage levels by changing reference voltage source 475 and Zener diode 480. In one embodiment, for example, reference voltage source 475 and Zener diode 480 may be selected so as to generate 20V and 16V, respectively. This allows Zener diode 480 to clamp voltage Vzener and switch 465's gate voltage $V_G$ to 16V. Accordingly, converter 400 may be able to produce output voltages $V_{OUT}$ of 12V and 20V. Output voltage $V_{OUT}$ of 12V results in 4V gate-to-source voltage $V_{GS}$ (or $V_{GS}=16V-12V$) upon switch 465, which turns off switch 465 and adds resistor 460 to the series connection to optocoupler 455. Output voltage $V_{OUT}$ of 20V results in −4V gate-to-source voltage $V_{GS}$ (or $V_{GS}=16V-20V$), which turns on switch 465 and removes resistor 460 from the series connection to optocoupler 455. Besides producing 12V and 20V, converter 400 may also produce output voltages of 15V and 20V, for example. When output voltage $V_{OUT}$ becomes 15V, gate-to-source voltage $V_{GS}$ becomes 1V (or $V_{GS}=16V-15V$), which turns off switch 465 and adds resistor 460 to the series connection with optocoupler 455. When output voltage $V_{OUT}$ reaches 20V, gate-to-source voltage $V_{GS}$ becomes −4V (or $V_{GS}$=16V−20V), which turns on switch 465 and removes resistor 460 from the series connection to optocoupler 455.

Figure 7:
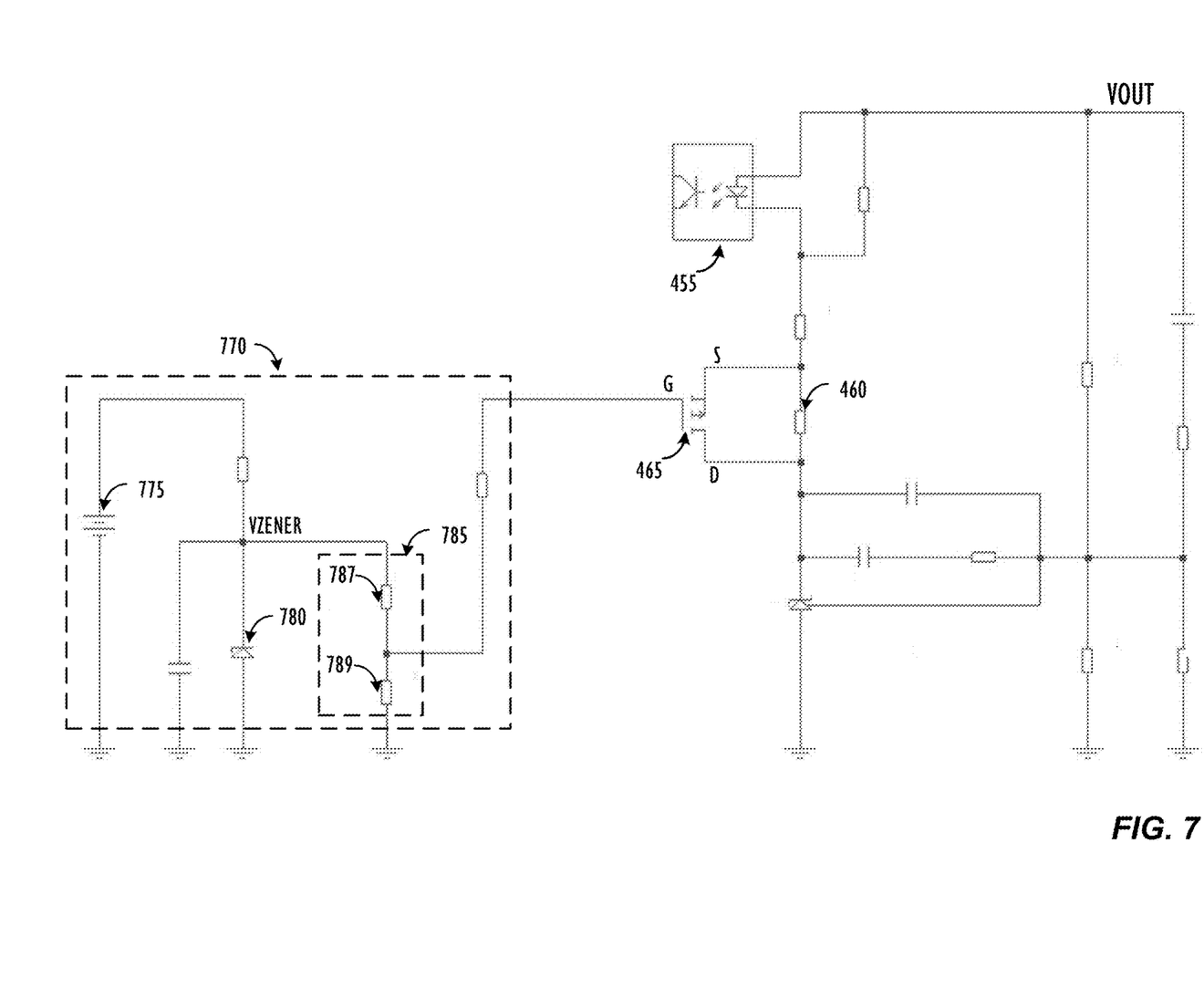
FIG. 7 is a schematic diagram illustrating a portion of a feedback circuit of an exemplary AC/DC power converter in accordance with another embodiment.

FIG. 7 is a schematic diagram illustrating a portion of the feedback circuit 435 of exemplary converter 400 (in FIG. 4) in accordance with another embodiment. Instead of using control circuit 470, converter 400 may include an alternative control circuit 770, which may include reference voltage source 775, Zener diode 780, and voltage dividing circuit 785. Voltage dividing circuit 785 may comprise a plurality of resistors, e.g., resistors 787-789. By selecting reference voltage source 775, Zener diode 780, and voltage dividing circuit 785 appropriately, converter 400 may activate (or turn on) and deactivate (or turn off) switch 465 at different output voltage levels as needed. According to FIG. 7, voltage Vzener and switch 765's gate voltage $V_G$ satisfy a voltage dividing relationship according to equation (1):

$$V_G = V_{zener} \times \frac{R_{789}}{R_{787} + R_{789}}, \quad (1)$$

where $R_{787}$ and $R_{789}$ represent the resistance of resistors 787 and 789, respectively. By selecting the resistance $R_{787}$ and $R_{789}$ appropriately, voltage dividing circuit 785 may provide different voltage dividing ratios, and switch 765's gate voltage $V_G$ may be adjusted to different values. For example, gate voltage $V_G$ may be adjusted to 13V, and then converter 400 may produce output voltage $V_{OUT}$ of 5V and 20V, or 9V and 20V, as described above in the example of FIG. 4. Conversely, switch 465's gate voltage $V_G$ may also be adjusted to 16V, and then converter 400 may generate output voltage $V_{OUT}$ of 12V and 20V, or 15V and 20V.

In some embodiments, voltage dividing circuit 785 may include two or more resistors where each one and/or some of the resistors may be coupled in parallel to individual bypass switches. By controlling the individual bypass switches, the corresponding resistors may be bypassed (or removed) from voltage dividing circuit 785. Accordingly, voltage dividing circuit 785 may provide even more voltage dividing ratios, and thus switch 465 may obtain a variety of gate voltages $V_G$ values. This enables converter 700 to generate more than two output voltage levels in operations.

Figure 8:
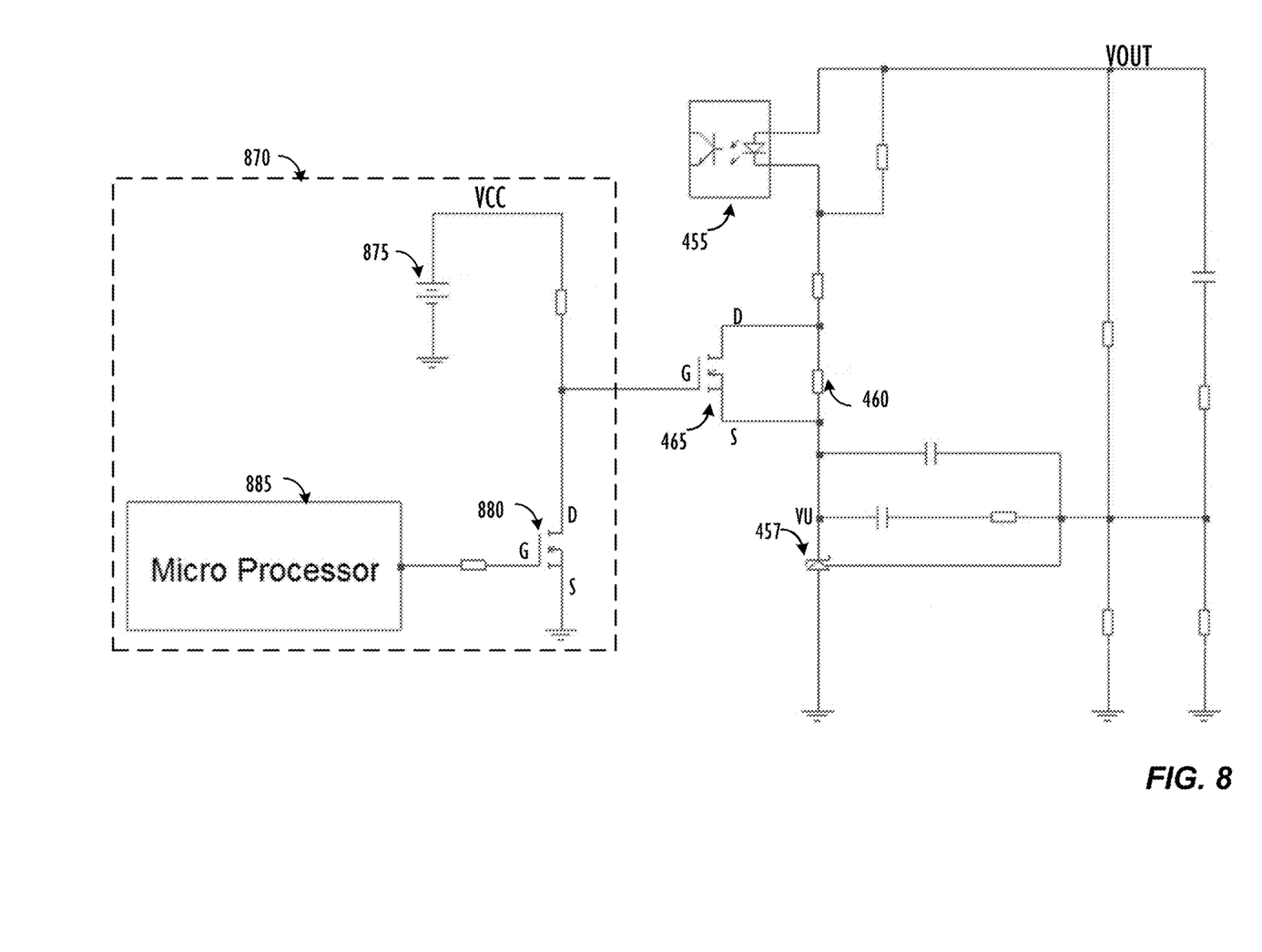
FIG. 8 is a schematic diagram illustrating a portion of a feedback circuit of an exemplary AC/DC power converter in accordance with another embodiment.

FIG. 8 is a schematic diagram illustrating a portion of the feedback circuit 435 of exemplary converter 400 (in FIG. 4) in accordance with another embodiment. Instead of using control circuit 470, converter 400 may include an alternative control circuit 870, which may include reference voltage source 875, switch 885, and adjustable voltage source 885. Adjustable reference voltage source 885 may be a microprocessor, or other types of circuits that could provide appropriate control signals of adjustable values. Switches 465 and 880 may be n-channel MOSFETs, as shown in FIG. 8, or any other types of switching devices. As n-channel MOSFETs, switches 465 and 880 may be turned on when their gate-to-source voltages $V_{GS}$ exceed the corresponding threshold voltages, and turned off when gate-to-source voltages $V_{GS}$ fall below the threshold voltages. The typical threshold voltage of n-channel MOSFETs is between 1V and 3V. Referring to FIG. 8, adjustable reference voltage source 885 may control switch 880 in accordance with output voltage $V_{OUT}$ of converter 400. For example, when output voltage $V_{OUT}$ reaches 5V, adjustable reference voltage source 885 may receive a feedback signal representative of output voltage $V_{OUT}$ and turn on switch 880, which may pull down switch 465's gate voltage $V_G$ to ground (or $V_G$=zero).

In FIG. 8, as a n-channel MOSFET, switch 465's source voltage $V_S$ is coupled to voltage $V_U$ (or $V_S$=Vu), which may be a constant voltage (e.g., $V_U$=5V) created by adjustable voltage regulator 457. Thus, switch 465's gate-to-source voltage $V_{GS}$ becomes −5V (i.e., $V_{GS}$=$V_G$−$V_S$) and switch 465 is turned off. This adds resistor 460 to the series connection with optocoupler 455. When converter 400's output voltage $V_{OUT}$ becomes, for example, 20V, adjustable reference voltage source 885 may sense the voltage change and turn off switch 880, which may pull up switch 465's gate voltage $V_G$ to an output voltage $V_{CC}$ (e.g., 15V) of reference voltage source 875 (or $V_G$=15V). Thus, switch 465's gate-to-source voltage $V_{GS}$ becomes 10V (i.e., $V_{GS}$=$V_G$−$V_S$), which turns on switch 465 and removes resistor 460 from the series connection with optocoupler 455. Output voltage levels of 5V and 20V are used here as illustrative examples. Control circuit 870 could be configured to provide the gain adjustment to converter 400 at other output voltage levels, following the above-described principles.

Figure 9:
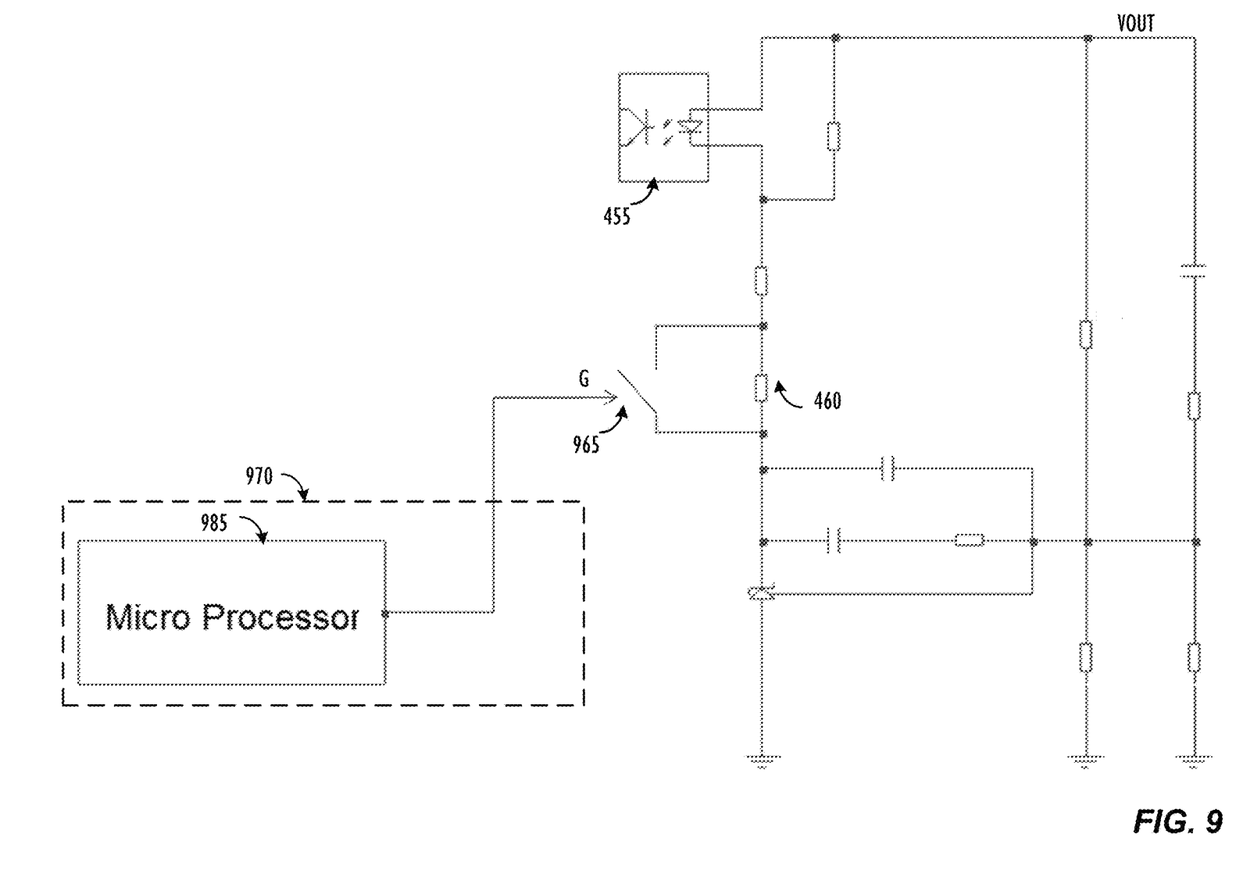
FIG. 9 is a schematic diagram illustrating a portion of a feedback circuit of an exemplary AC/DC power converter in accordance with another embodiment.

FIG. 9 is a schematic diagram illustrating a portion of the feedback circuit 435 of exemplary converter 400 (in FIG. 4) in accordance with another embodiment. Instead of using switch 465 and control circuit 470, converter 400 may alternatively include switch 965 and control circuit 970. As shown in FIG. 9, resistor 460 may be coupled in parallel to switch 965 and meanwhile in series to optocoupler 455. Switch 965 may be, for example, an n-channel MOSFET, a p-channel MOSFET, an insulated-gate bipolar transistor (IGBT), or an electronic relay. Switch 965 may be controlled by control circuit 970. Control circuit 970 may include adjustable reference voltage source 985. Adjustable reference voltage source 985 may be a microprocessor, or other types of circuits that could provide appropriate control signals of adjustable values. Adjustable reference voltage source 985 may control switch 965 in accordance with output voltage $V_{OUT}$ of converter 400. For example, when output voltage $V_{OUT}$ reaches one level, adjustable reference voltage source 985 may sense the value of output voltage $V_{OUT}$ and activate switch 965, which retains resistor 460 in the series connection with optocoupler 455. When output voltage $V_{OUT}$ changes to another level, adjustable reference voltage source 985 may sense the voltage change and deactivate switch 965, thus removing resistor 460 from the series connection with optocoupler 455.

Figure 10:
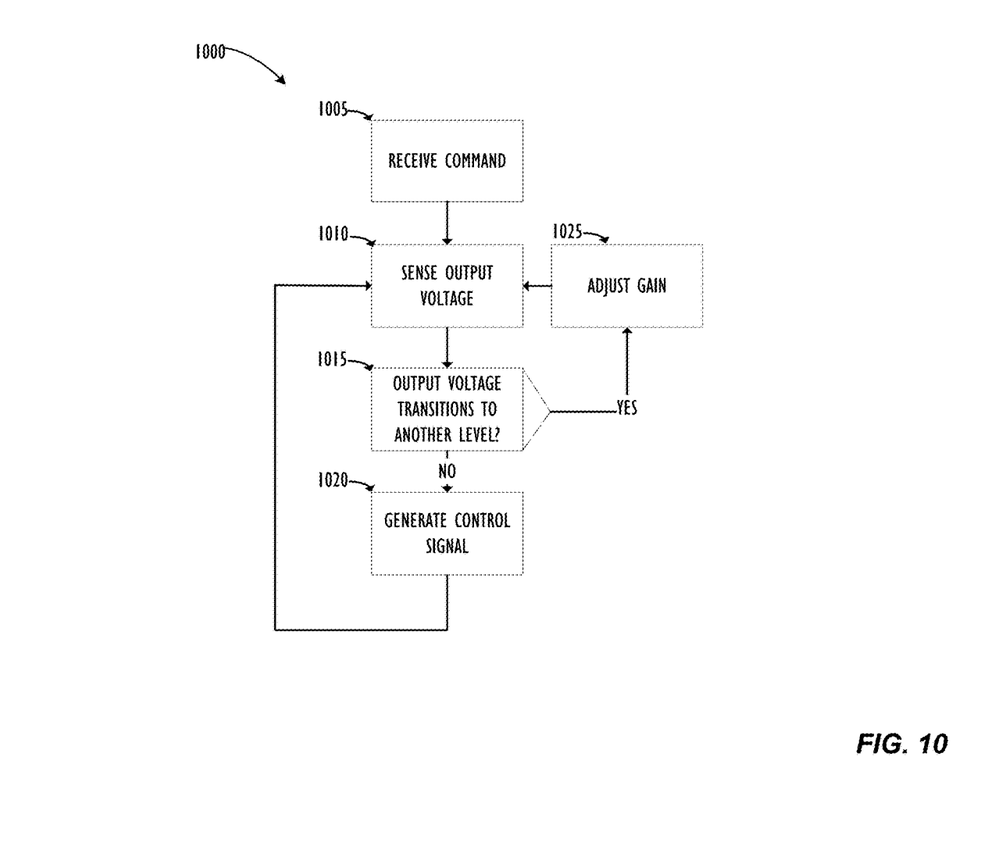
FIG. 10 is a flowchart illustrating a closed-loop operation of an exemplary AC/DC power converter in accordance with one embodiment.

FIG. 10 is the flowchart illustrating an exemplary closed-loop operation 1000 of an AC/DC power converter in accordance with one embodiment. The converter may receive a command to produce an output voltage of a new level (block 1005). The converter monitors the operation of the converter, for example, the output voltage using a feedback circuit (block 1010). Based on the monitoring, the converter generates feedback signals and detects output voltage transitions (block 1015). If the output voltage does not transition from one level to another, which would not require a gain adjustment, as a closed-loop system, the converter deactivates the gain adjustment operation, and continuously monitors and regulates the output voltage towards the commanded level (block 1020). However, if an output voltage transition is detected, for example, by sufficient voltage changes, the converter activates the gain adjustment operation accordingly (block 1025). Once the gain adjustment is performed, the converter obtains new gain and phase margins to remain stable at the new output voltage level.

In the explanation so far, the disclosure discusses the use of only one single resistor (e.g., resistor 465) to achieve a gain adjustment performance. Typically, once the resistor is selected to maintain a converter stable at a converter's boundary operating conditions (e.g., at the minimum and maximum output voltage levels), the converter will likely remain stable at other operational conditions within the boundaries (e.g., at levels between the min. and max. voltages). In one embodiment, instead of using one single resistor, the converter may use two or more resistors. The two or more resistors may be arranged in series and/or parallel configurations. Each one and/or some of the resistors may be coupled in parallel to individual bypass switches and/or series to isolation switches. Each one of the individual bypass and/or isolation switches may be controlled as switches 465 and 965 illustrated in FIGS. 4 and 7-9, based on the converter's output voltage, to retain or remove the corresponding resistors in/from the converter's feedback circuit. By doing this, the converter may obtain various impedance changes in its feedback circuit and thus receive more gain adjustment flexibilities.

The various embodiments described above are provided by way of illustration only and should not be construed to limit the scope of the disclosure. Various modifications and changes can be made to the principles and embodiments described herein without departing from the scope of the disclosure and without departing from the claims that follow.

The invention claimed is:

1. A power supply, comprising:
a first terminal configured to receive an input voltage from a power source;
a second terminal configured to provide an output voltage;
a transformer having a primary winding coupled to the first terminal and a secondary winding coupled to the second terminal;
a first switch coupled to the primary winding and configured to control a flow of current through the primary winding based on a first control signal;
an optocoupler coupled to the secondary terminal and the first switch and configured to convey a feedback signal representative of the output voltage as the first control signal; and
a gain adjustment circuit configured to adjust a gain of the feedback signal by controlling a flow of current through the optocoupler based, at least in part, on the output voltage of the power supply.

2. The power supply of claim 1, wherein the gain adjustment circuit comprises one or more impedance elements and one or more switching devices configured to alter a connection of at least one of the one or more impedance elements to the feedback circuit.

3. An isolated power converter, comprising:
an input terminal, an output terminal, and a transformer providing isolation between the input and output terminals;
one or more switching devices coupled to a primary winding of the transformer and configured to control a flow of current through the primary winding to generate a plurality of desired output voltages at the output terminal;
a feedback circuit comprising an optocoupler, the feedback circuit being operationally coupled between the output terminal and a controller for the one or more switching devices; and
a gain adjustment circuit coupled to the feedback circuit and configured to adjust a gain of the feedback circuit based, at least in part, on a selected one of the plurality of output voltages.

4. The isolated power converter of claim 3, wherein:
the one or more switching devices comprise a first switch;
the gain adjustment circuit comprises a first resistor and a second switch, the first resistor coupled in parallel to the second switch, the first resistor coupled in series to the optocoupler;
the optocoupler is configured to convey a feedback signal representative of the output voltage as the first control signal; and
the gain adjustment circuit is configured to adjust a gain of the feedback signal by controlling a flow of current through the optocoupler by the first resistor and the second switch.

5. The isolated power converter of claim 4,
wherein the gain adjustment circuit is configured to turn off the second switch based, at least in part, on a first output voltage level, and
wherein turning off the second switch retains the first resistor in series to the optocoupler.

6. The isolated power converter of claim 5,
wherein the gain adjustment circuit is configured to turn on the second switch based, at least in part, on a second output voltage level, and
wherein turning on the second switch removes the first resistor from the series connection to the optocoupler.

7. The isolated power converter of claim 6,
wherein the isolated power converter comprises a second control circuit coupled to the second switch,
wherein the second control circuit comprises a first reference voltage source and a Zener diode, and
wherein the first reference voltage source and the Zener diode are configured to provide a control signal for the second switch based, at least in part, on the first output voltage level and the second output voltage level.

8. The isolated power converter of claim 4,
wherein the isolated power converter comprises a second control circuit coupled to the second switch,
wherein the second control circuit comprises a first reference voltage source, a Zener diode, and a voltage dividing circuit,
wherein the voltage dividing circuit comprises a plurality of resistors coupled in series, and
wherein the first reference voltage source, the Zener diode, and the plurality of resistors are configured to provide a control signal for the second switch based, at least in part, on a third output voltage level.

9. The isolated power converter of claim 4,
wherein the isolated power converter comprises a second control circuit coupled to the second switch,
wherein the second control circuit comprises an adjustable reference voltage source, and
wherein the adjustable reference voltage source is configured to provide a control signal for the second switch based, at least in part, on two or more output voltage levels.

10. The isolated power converter of claim 9,
wherein the second control circuit further comprises a third reference voltage source and a third switch, and
wherein the second switch is configured to be controlled by the adjustable reference voltage source through the third switch and the third reference voltage source.

11. The isolated power converter of claim 9, wherein the adjustable reference voltage source is a microprocessor.

12. The isolated power converter of claim 3, wherein the gain adjustment circuit comprises one or more impedance elements and one or more switching devices configured to alter a connection of at least one of the one or more impedance elements to the feedback circuit.

13. The isolated power converter of claim 12, wherein the one or more impedance elements are resistors.

14. The isolated power converter of claim 13, wherein the one or more switching devices are configured to remove at least one of the one or more resistors from the feedback circuit.

15. A method to enhance stability of a power conversion apparatus having an input terminal and an output terminal isolated by a transformer, the method comprising:
   controlling a flow of current through a primary winding of the transformer using one or more switching devices coupled to the primary winding to generate a plurality of output voltages at the output terminal;
   providing a feedback signal representative of the output voltage through an optocoupler; and
   adjusting a gain of the feedback signal through a gain adjustment circuit based, at least in part, on the output voltage of the power conversion apparatus.

16. The method of claim 15, wherein adjusting the gain of the feedback circuit through a gain adjustment circuit comprises altering a connection of one or more impedance elements to the feedback circuit using one or more switching devices of the gain adjustment circuit.

17. The method of claim 16, wherein altering the connection of the one or more impedance elements to the feedback circuit comprises removing one or more resistors from the feedback circuit.

18. The method of claim 16, wherein the one or more switching devices of the gain adjustment circuit are controlled based, at least in part, on the selected one of the plurality of output voltages by a control circuit using a Zener diode.

19. The method of claim 16, wherein the one or more switching devices of the gain adjustment circuit are controlled based, at least in part, on the selected one of the plurality of output voltages by a control circuit using an adjustable voltage source- controlled switch.

20. The method of claim 19, wherein the adjustable voltage source is a microprocessor.

* * * * *